Jan. 23, 1968  R. S. MUELLER  3,365,244
ANTI-SKID SENSOR MECHANISM

Filed Jan. 21, 1966  3 Sheets-Sheet 1

INVENTOR.
ROBERT S. MUELLER
BY Hoffmann and Yount
ATTORNEYS

INVENTOR.
ROBERT S. MUELLER
BY Hoffmann and Yount
ATTORNEYS

Jan. 23, 1968  R. S. MUELLER  3,365,244
ANTI-SKID SENSOR MECHANISM
Filed Jan. 21, 1966  3 Sheets-Sheet 3

INVENTOR.
ROBERT S. MUELLER
BY *Hoffmann and Yount*
ATTORNEYS

United States Patent Office 3,365,244
Patented Jan. 23, 1968

3,365,244
ANTI-SKID SENSOR MECHANISM
Robert S. Mueller, Oak Park, Mich., assignor to Eaton Yale & Towne Inc., a corporation of Ohio
Filed Jan. 21, 1966, Ser. No. 522,214
16 Claims. (Cl. 303—21)

The present invention relates to a control mechanism operable to compare the linear velocity of a vehicle with the angular velocity of certain wheels of the vehicle, and particularly relates to such a control mechanism for use in controlling the brakes of the vehicle so as to relieve the braking force when the angular velocity of certain wheels of the vehicle reduces but the linear velocity of the vehicle is not correspondingly reduced, as when the vehicle skids upon the application of the brakes of the vehicle.

The principal object of the present invention is the provision of a new and improved control mechanism operated to compare the linear velocity of a vehicle with the angular velocity of certain wheels of the vehicle and which is highly reliable, compact, and quite sensitive to variance between the linear velocity of the vehicle and angular velocity of certain wheels thereof.

Another object of the present invention is the provision of a new and improved control mechanism which is highly reliable in operation and which is operable to compare the angular velocity of certain wheels of the vehicle with the linear velocity of the vehicle and which includes a rotatable member driven at an angular velocity proportional to the angular velocity of one of the wheels of the vehicle and a flywheel which is driven by the rotatable member through a disconnectible drive having a part which is yieldably connected to the flywheel.

A still further object of the present invention is the provision of a new and improved control mechanism, as noted in the next preceding object, wherein the yieldable drive connection includes a spring having a hub portion secured to the part and spring fingers extending from the hub portion and engaging the flywheel.

A still further object of the present invention is the provision of a new and improved control mechanism for comparing the linear velocity of a vehicle with the angular speed of rotation of at least one wheel of the vehicle and wherein a rotatable member is driven at an angular velocity proportional to the angular velocity of one wheel of the vehicle and a flywheel driven from the rotatable member through a disconnectible drive connection which includes a driving member and a driven member and wherein the driving member is drivingly connected to the rotatable member through a yieldable member which transmits torque therebetween and biases the driving and driven members into driving engagement.

Still another object of the present invention is the provision of a new and improved control mechanism, particularly useful in a brake control system for relieving the pressure in hydraulic brake lines, and which includes a rotatable member driven at an angular velocity proportional to the angular velocity of certain vehicle wheels and a flywheel drivingly connected to the rotatable member through a disconnectible drive connection which includes a part which is shiftable axially when the linear velocity of the vehicle is not correspondingly reduced when the angular velocity of certain wheels of the vehicle are reduced such as when the vehicle is in a skid condition, and which movement of the part effects actuation of a control signal to relieve the pressure in the hydraulic brake lines of the vehicle and wherein the shifting part is prevented from producing the control signal while the vehicle is traveling in reverse by a collar member which has a portion which is movable during reverse movement of the vehicle into a position effective to prevent the axially shifting part from producing the control signal.

A still further object of the present invention is the provision of a new and improved control mechanism, as noted in the preceding object wherein the collar member and the axially shiftable part have abutments which are moved into axial alignment when the vehicle is traveling in reverse and which are out of axial alignment during forward traveling of the vehicle.

Further objects and advantages of the present invention will be apparent to those skilled in the art to which it relates from the detailed description of the preferred embodiment thereof made with reference to the accompanying drawings forming a part of this specification and in which.

Figure 1:
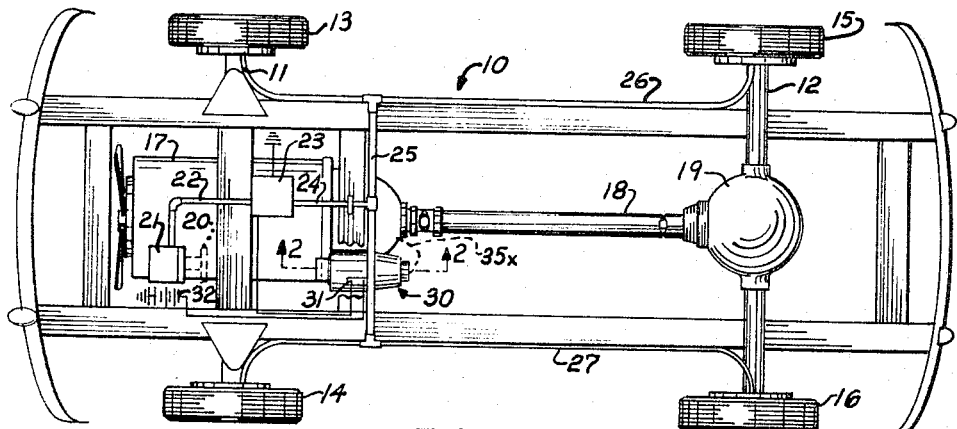
FIG. 1 is a schematic plan view of a vehicle embodying the present invention.

The present invention provides an improved control mechanism for use in an automotive vehicle for comparing the linear velocity of the vehicle with the angular speed of rotation of at least one wheel of the vehicle. The control mechanism is operable to provide a control signal when the linear velocity of the vehicle is excessive when compared with the angular speed of rotation of at least one wheel of the vehicle. The control mechanism of the present invention is particularly useful as an anti-skid device used in a brake control system for controlling the braking force applied to the wheels of the vehicle. The control mechanism is operable to relieve the braking pressure applied to the brakes of the vehicle when the linear velocity of the vehicle is excessive as compared with the angular speed of rotation of certain wheels of the vehicle, which occurs when the vehicle skids upon the application of the vehicle brakes.

The present invention, as shown in the drawings, is preferably embodied in an automotive vehicle 10. The vehicle 10 includes a front axle 11 and a rear axle 12. The front axle 11 carries a pair of ground engaging wheels 13, 14 and the rear axle 12 likewise carries a pair of ground engaging wheels 15, 16. The rear wheels 15, 16 are driven from the vehicle engine 17 through a drive shaft 18 and differential 19.

The automotive vehicle 10 includes a hydraulic brake system for applying a braking force to each of the wheels of the vehicle. The brakes, of course, are applied upon depression of a brake pedal 20 which cooperates with a master cylinder 21. The master cylinder 21 is connected by a hydraulic line 22 to a valve 23. The valve 23 is connected through a hydraulic conduit 24 to a hydraulic conduit 25. The hydraulic conduit 25 extends transversely of the vehicle and connects with hydraulic conduits 26 and 27 on opposite sides of the vehicle. The conduit 26 delivers hydraulic fluid to hydraulically actuated brakes at the wheels 13 and 15, and the hydraulic conduit 27 delivers hydraulic fluid to hydraulically actuated brakes at the wheels 14, 16. The valve 23 in the hydraulic line is a well-known solenoid operated valve which is operable to relieve hydraulic pressure in the conduits 24–27 in a manner not illustrated. The valve is of conventional construction and will not be described in detail. Reference may be made to United States Patent No. 3,165,180 for a disclosure of such a valve and its mode of operation.

The brake control system includes a control mechanism 30 for actuating operation of the valve 23 and thereby controls the braking force applied to the wheels of the vehicle. The control mechanism 30 is operable to compare the linear velocity of the vehicle with the angular speed of rotation of at least one wheel of the vehicle and in the embodiment shown in the drawings, compares the linear velocity of the vehicle with the average angular speed of the rear wheels 15, 16 of the vehicle. The control mechanism 30 is operable when the linear speed of the vehicle is excessive as compared to the average angular speed of rotation of the rear wheels 15, 16 to provide a control signal which energizes the valve 23. Specifically, under these conditions, the control mechanism 30 actuates a microswitch 31 which completes the circuit from the battery 32 of the vehicle through the switch 31 to the valve 23 to energize the valve 23. This, of course, causes the valve 23 to operate to relieve the hydraulic pressure in the lines 24–27. A mechanical arrangement for actuating the relief of the hydraulic pressure in lines 24–27, of course, could be substituted for the described circuit.

From the above, it should be apparent that the control mechanism 30 will operate to prevent or minimize skidding of the vehicle. The control mechanism so operates by comparing the linear velocity of the vehicle with the average angular speed of rotation of the rear wheels 15, 16 of the vehicle. Normally, when the average angular speed of the rear wheels 15, 16 of the vehicle decreases as when the brakes are applied, the linear velocity of the vehicle correspondingly decreases. However, in the event that the linear speed of the vehicle does not correspondingly decrease, as when the vehicle slides or skids, the control mechanism 30 is operable to actuate the switch 31 and relieve the braking pressure in the lines 24–27 by actuating the valve 23. This, of course, relieves the pressure applied to the wheels and thereby minimizes skidding of the vehicle. Thus, the control mechanism 30 does minimize skidding and enables the operator to maintain a good control over the vehicle.

Figure 2:
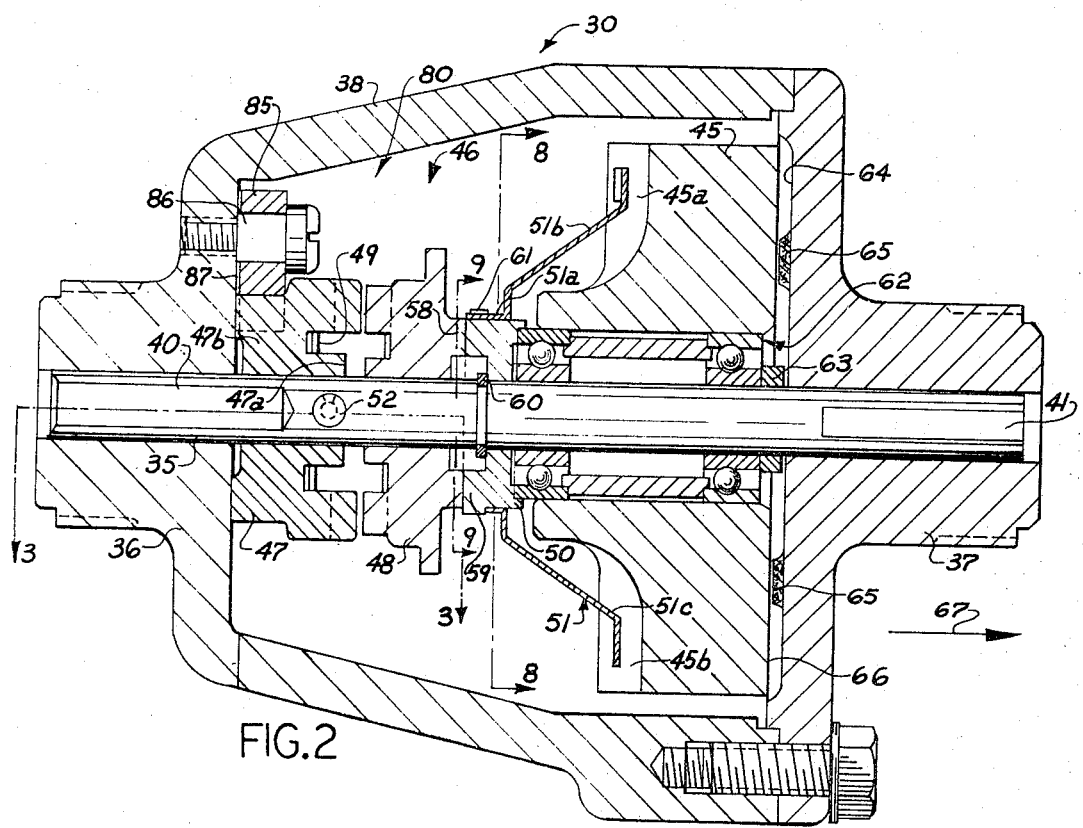
FIG. 2 is a sectional view of a control mechanism shown in FIG. 1 and taken approximately along section line 2—2 of FIG. 1.

The control mechanism 30 includes a rotatable shaft member 35 which is rotated at an angular velocity proportional to the average angular velocity of the rear wheels of the vehicle. As shown schematically in FIG. 1, the shaft member 35 is driven from the transmission of the vehicle by a suitable drive mechanism indicated by the dash line 35X such as the drive for the vehicle speedometer, conventional in vehicle transmissions. The shaft member 35 is supported at its opposite ends by support portions 36, 37 which form part of a housing 38. As shown in FIG. 2, the opposite ends of shaft 35 have sockets 40 and 41 therein providing a drive connection for a speedometer cable of the vehicle.

The control mechanism 30 also includes a vehicle deceleration sensing flywheel 45. The flywheel 45 is at all times rotated at an angular velocity proportional to the linear velocity of the vehicle and thus senses the linear velocity of the vehicle. The flywheel 45 is, under normal conditions, driven from the shaft 35. and it should be obvious that under normal conditions the average angular speed of the rear wheels 15, 16 of the vehicle is proportional to the linear velocity of the vehicle. The flywheel 45 is specifically driven by a disconnectible drive 46 acting between the rotatable shaft member 35 and the flywheel 45. The disconnectible drive 46 includes a collar member 47 driven from the shaft 35 and a spring follower member 48 drivingly connected to a spring 49 also driven from the shaft 35. A flywheel ratchet follower 50 is driven from the spring follower member 47 and a spring 51 transmits torque between the ratchet follower member 50 and the flywheel 45. The collar 47, spring follower member 48 and the flywheel ratchet follower 50 are in the form of sleeves which encircle shaft 35 and are spaced axially therealong and together with springs 49 and 51 transmit torque from shaft 35 to flywheel 45.

The collar 47 is driven from shaft 35 by means of a pin 52 extending radially through the shaft 35 and the projecting opposite end portions of the pin are received in respective diametrically opposed recesses 53, 54 (see FIG. 5) formed in a hub portion 47a of the collar 47. The hub portion 47a extends axially from one side of a body portion 47b of the collar 47 and encircles the shaft 35. Rotation of shaft 35 rotates the collar member 47 by driving pin 52 into engagement with the wall portion 53a and 54a or 53b and 54b of the hub 47a defining the recesses 53, 54.

Figure 5:
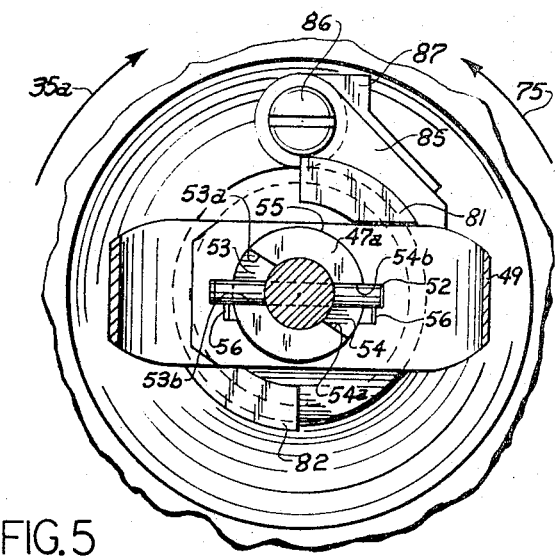
FIG. 5 is a sectional view of the control mechanism taken substantially along section line 5—5 of FIG. 4.
Figure 6:
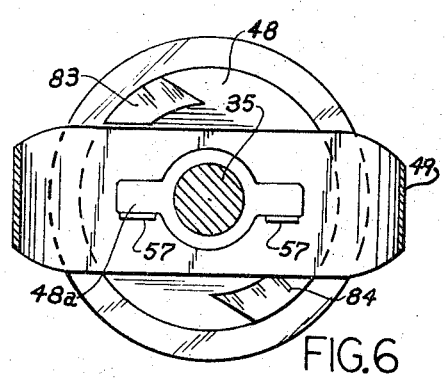
FIG. 6 is a sectional view of the control mechanism taken substantially along section line 6—6 of FIG. 4.

The spring 49 as noted above, transmits the drive from the shaft 35 to the spring follower 48. The spring 49 is an elongated strip of spring material which is supported for rotation relative to the collar member 47 and is drivingly connected with spring follower member 48. The spring 49 has a series of three cut-out portions along the length thereof and when the spring is assembled in operative relationship it takes the form of a closed loop and two openings adjacent the opposite ends of the spring are overlapped and extend over pin 52 and hub portion 47a of the member 47. The central opening in the spring member 49 extends over a central abutment 48a formed integral with the spring follower member 48. The spring 49 further has four driving tabs 56 and 57 (FIGS. 5 and 6). The tabs 56 engage the opposite ends of pin 52, and tabs 57 engage spaced portions of the central abutment member 48a of the spring follower member 48. Rotation of the pin 52 causes rotation of the collar 47 due to the pin engaging the walls of recesses 53, 54 and also causes rotation of spring 49 due to engagement of the pin 52 with tabs 56. Rotation of the spring 49 transmits torque to the central abutment portion 48a of spring follower member 48 due to tabs 57 and thereby effects rotation of the spring follower member 48.

Figure 7:
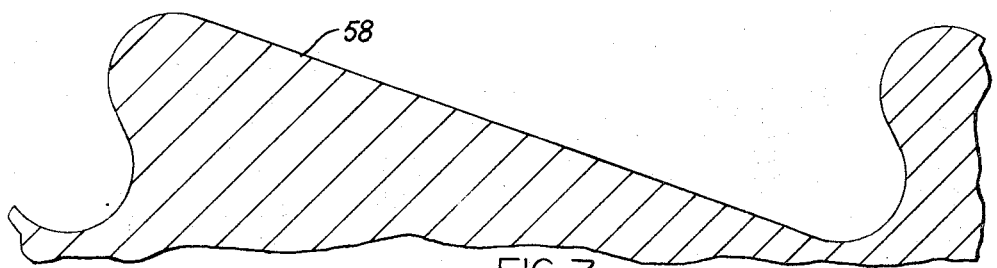
FIG. 7 is an enlarged fragmentary sectional view of a portion of the control mechanism shown in FIG. 4 on an enlarged scale.
Figure 8:
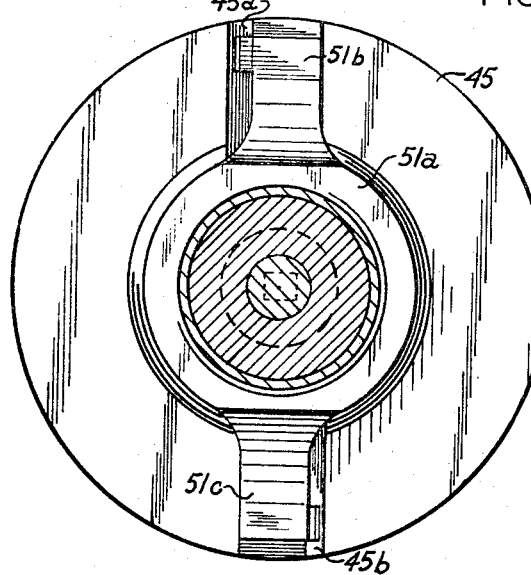
FIG. 8 is a sectional view of the control mechanism of FIG. 2 taken approximately along section line 8—8 of FIG. 2.
Figure 9:
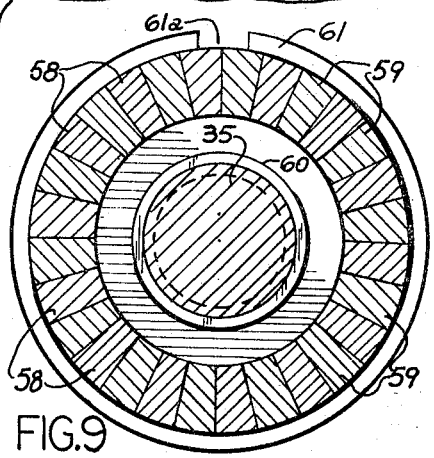
FIG. 9 is a sectional view of the control mechanism taken substantially along section line 9—9 of FIG. 2.

The spring follower member 48 drives the flywheel ratchet follower 50 and has a plurality of driving fingers 58 which project toward the flywheel ratchet follower 50 and extend at an angle to the axis of rotation of the flywheel 45. The flywheel ratchet follower 50 also has a plurality of fingers 59 which project toward the spring follower member 48 and normally intermesh with the fingers 58 and transmit the drive therebetween. The fingers 58 and 59 have a mating configuration illustrated in FIG. 7 and form in effect a one-way clutch. Fingers 58 are biased into engagement with fingers 59 by spring 49 to effect a driving connection between these members. The spring follower 48 is axially slidable on shaft 35 against the bias of spring 49 and is moved to the left as viewed in FIG. 2 against the bias of spring 49 upon rotation of the flywheel ratchet follower 50 relative to the spring follower member 48 which disconnects the drive to the flywheel 45. The flywheel ratchet follower 50 is supported on shaft 35 and axially fixed thereon. A retainer ring 60 engages the side thereof and an axially fixed bearing engages the other side thereof.

Torque is transmitted between the flywheel ratchet follower 50 and the flywheel 45 by spring 51. Spring 51 comprises a central hub portion 51a which extends about the outer periphery of the ratchet follower 50 and is held against rotation relative to the ratchet follower by a circumferential rib 61 which has an opening 61a through which a portion of the hub member 51a extends as shown in FIG. 2. Two fingers 51b and 51c extend outwardly and upwardly from the hub portion 51a and the outer tips of which are received in a pair of diametrically opposed recesses 45a and 45b formed in the flywheel 45. From this construction, it should be appreciated that spring 51 provides a yieldable driving connection which is effective to transmit torque between the ratchet follower 50 and flywheel 45.

The flywheel 45 is mounted for rotation about shaft 35 by a bearing 62 abutting the flywheel ratchet follower 50 at one end and the opposite end thereof abuts a retaining ring 63. The flywheel has sufficient clearance with the bearing 62 to permit the flywheel to slide axially of the bearing.

As noted above, the flywheel 45 is driven at all times at a speed proportional to the linear speed of the vehicle. Accordingly, upon deceleration of the vehicle, means is provided for reducing the angular velocity of the flywheel in proportion to the linear deceleration of the vehicle. The means for reducing the angular velocity of the flywheel in proportion to the linear deceleration of the vehicle comprises a plurality of arcuate friction pads 65 arranged in a circumferential pattern on a portion of the front inner face 64 of housing 38 so as to engage a radial face 66 of the flywheel 45 when the vehicle decelerates. The friction pads could be of any suitable configuration, such as a torus configuration instead of the construction shown. When the vehicle 10 decelerates, the inertia thereof causes the flywheel 45 to slide relative to shaft 35 toward the front end of the vehicle in the direction as indicated by the arrow 67 in FIG. 2. The amount of sliding movement permitted is slight and has been exaggerated in the drawings for illustration purposes. When flywheel 45 shifts relative to the shaft 35 in the direction of the arrow 67, the radial surface 66 of the flywheel engages the friction pads 65. The friction pads 65 thus slow the angular speed of rotation of the flywheel 45 so that the rotation of the flywheel 45 remains proportional to the linear speed of the vehicle, even though the vehicle is decelerating. The disconnectible drive 46 and specifically the axial depth of recesses 45a and 45b in flywheel 45 is sufficient to permit the sliding of the flywheel relative to the spring fingers 51b and 51c without disconnecting the driving connection therebetween. The construction is such that under normal non-skidding conditions the angular velocities of the shaft 35 and flywheel 45 reach zero at substantially the same time and spring 51 provides a yieldable connection between the shaft 35 and flywheel 45 to compensate for the slight differential angular velocities existing therebetween during normal vehicle deceleration. Thus, under normal conditions, the flywheel 45 is constantly driven at a speed proportional to the linear speed of the vehicle.

In the event that the average angular speed of the rear wheels 15, 16 is decreased but the linear velocity of the vehicle is not correspondingly decreased, as when the vehicle slides, the shaft 35 decreases in angular velocity since it is driven at the average angular speed of the rear wheels 15, 16 of the vehicle. However, the flywheel 45 does not decrease in speed since the linear speed of the vehicle has not decreased and the flywheel has not shifted into braking engagement with the friction pads 65. Thus, the flywheel 45 rotates relative to the shaft 35 due to the kinetic energy which has built up in the flywheel 45 and in turn drives the ratchet follower to override the spring follower member 48. The relative rotation of the ratchet follower causes the fingers 59 fixedly connected with the ratchet follower 50 to rotate relative to the fingers 58 on the member 48 and due to the configuration of the fingers, the fingers 59 effect a camming of the spring follower member 48 against the bias of the spring 49 shifting the member 48 axially to the left as viewed in FIG. 2 and the fingers 58, 59 of the cooperating coupling parts of the disconnectible coupling 46 are out of driving mesh, and the flywheel 45 is free to rotate relative to the spring follower member 48. When this occurs, the flywheel 45 may or may not be shifted forwardly in the direction of the arrow 67 to engage the friction pads 65 because this occurs when the vehicle decelerates.

Figure 3:
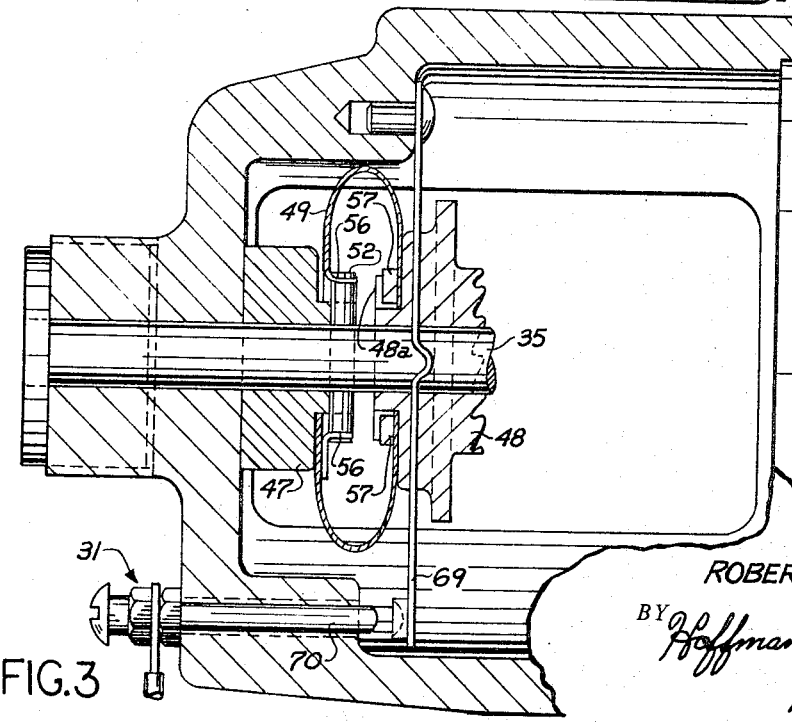
FIG. 3 is a fragmentary sectional view of the control mechanism shown in FIG. 2 and taken approximately along section line 3—3 of FIG. 2.
Figure 4:
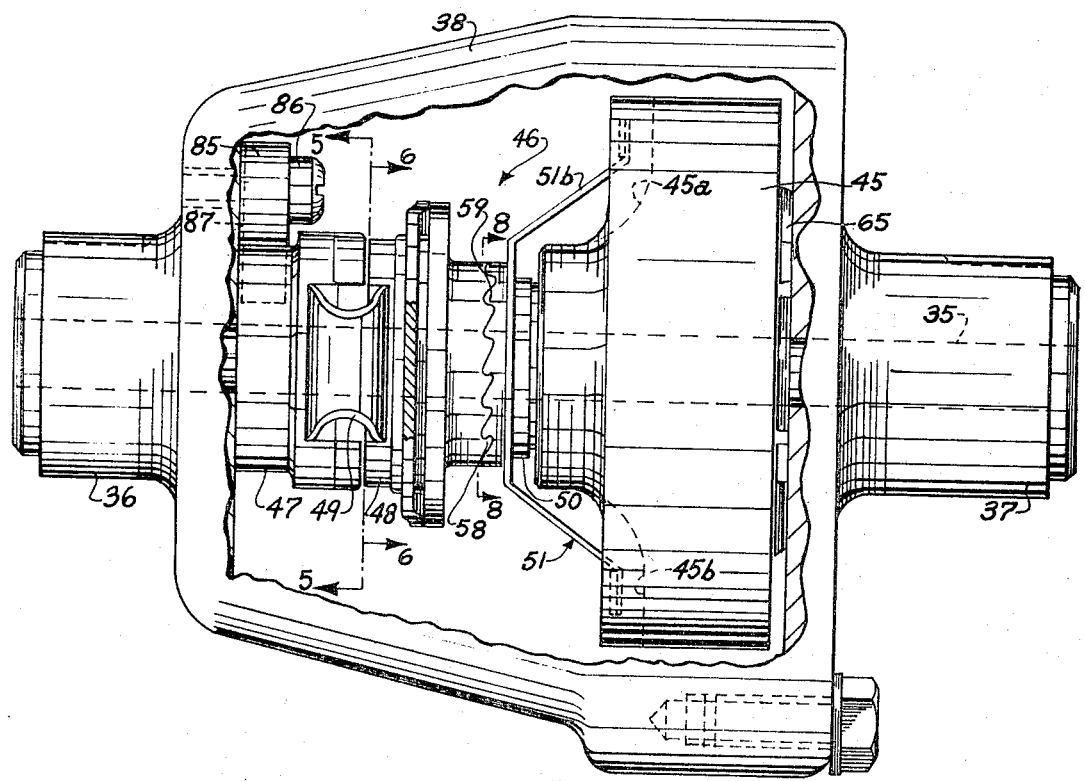
FIG. 4 is an elevational view of the control mechanism shown in FIG. 1 with parts broken away.

When the spring follower member 48 moves from the position shown in FIGS. 2 and 3 to the left, a switch contacting spring 69 engageable with spring follower member 48 and movable thereby engages a switch actuating member 70. When the switch actuating member 70 is engaged by the contacting spring 69, the microswitch 31 is actuated so as to energize the valve member 23 which, as noted above operates to relieve the hydraulic pressure in the lines 24–27 and releases the braking force on the vehicle wheels. This, of course, increases the angular velocity of the rear wheels 15, 16 and, in all probability, will cause the disconnectible coupling 46 to be reconnected so as to drive the flywheel 45 from the shaft 35. If the brake pressure is again applied and the rear wheels again begin slipping so that the linear velocity of the vehicle again does not decrease corresponding to the angular velocity of rotation of the shaft 35, the disconnectible drive 46 will again be disconnected, the switch 31 will again be actuated, and the valve 23 will again be actuated to relieve the pressure in the hydraulic lines 24–27. This action will take place in a continuous manner as long as the angular velocity of the vehicle deceleration sensing flywheel exceeds the velocity of the shaft 35 sufficiently to overcome the spring 49.

The control mechanism 30 is rendered inoperative when the vehicle is moving in a rearward or reverse direction. When the vehicle moves in a reverse direction, the shaft 35 rotates in the direction indicated by the arrow 75 in FIG. 5. When the shaft 35 is rotated in the direction of the arrow 75, the spring follower member 48 tends to rotate so as to move the fingers 58 out of engagement with the fingers 59, and the disconnectible drive 46 tends to disconnect, which would cause the member 48 to move toward the left, as viewed in FIG. 2, relative to the shaft 35. This, of course, would cause actuation of the switch 23 and a reduction in the pressure of the hydraulic lines 24–27. This would render the brakes of the vehicle 10 inoperative when the vehicle was going in reverse.

Accordingly, the control mechanism 10 includes means 80 for rendering the control mechanism 30 inoperative when the vehicle is moving in a reverse direction. The means 80 includes a pair of diametricaly opposed abutments 81, 82 which extend axially from the collar member 47. The abutments 81, 82 face the spring follower member 48 and are axially alignable with a pair of axially extending abutments 83, 84 on the spring follower member 48 during reverse movement of the vehicle and when the abutments are so aligned, the spring follower member is prevented from shifting axially along shaft 35 to engage the switch actuating member 70. During forward movement of the vehicle the abutments 81, 83 and 82, 84 are not in axial alignment and do not interfere with movement of the spring follower member. Thus, the abutments 81–84 prevents movement of the spring follower member 48 so that the switch member 31 is not actuated thereby during reverse movement of the vehicle.

The abutments are moved between their axial disaligned and axial aligned positions in response to rotation of the shaft 35 and, more specifically, in response to rotation of the spring follower member 48 by the shaft 35 relative to the collar 47. After assembling spring 49 on members 47 and 48, the spring 49, members 47, 48 and pin 52 are in the relative positions illustrated in FIGS. 5 and 6. While the parts are in this position, abutments 81, 83 and 82, 84 are in axial alignment. During initiation of forward travel of the vehicle, shaft 35 rotates in the direction of arrow 35a and drives pin 52 and spring 49 relative to recesses 53, 54 and abutments 81, 82 respectively, until pin 52 engages axially extending wall portions 53a and 54a defining portions of recesses 53 and 54 respectively, and thereafter imparting rotation to the collar member 47. This relative rotation between spring 49 and member 47 likewise imparts rotation to the spring follower member 48 relative to the collar member 47. Thus, the abutments 83 and 84 are moved out of axial alignment with abutments 81 and 82 on the collar member 47 which abutment positions are maintained during forward vehicle position and the spring follower member 48 is thus axially movable to actuate valve 23.

To insure that the required relative rotation between members 47 and 48 occurs, a brake 85 is biased into frictional engagement with the outer periphery of the spring driver 47. The brake 85 is pivoted to housing 38 by a member 86 which also supports a spring 87 which biases brake 85 into engagement with the driver 47.

When the vehicle travels in reverse, shaft 35 rotates in direction of arrow 75 and moves the pin 52, spring 49 and spring follower member 48 relative to the spring driver member 47. This relative movement stops when pin 52 engages axially extending walls 53b and 54b which defines part of the recesses 53 and 54, respectively, on driver member 47 and which position of the parts is shown in FIG. 5. At this time abutments 81 and 83 are axially aligned and abutments 82 and 84 are aligned and the spring follower member 48 is prevented from moving to the left as viewed in FIG. 2 so as to prevent actuation of valve 23 during reverse vehicle travel.

From the above description, it should be apparent that applicant has provided a new and improved control mechanism which is operable to produce a control signal when the linear velocity of the vehicle is excessive as compared to the average angular velocity of the rear wheels 15, 16 of the vehicle. Moreover, it should be noted that the control mechanism operates to compare the angular velocity of a vehicle decelerator sensing flywheel with the angular velocity of a member rotated in proportion to the average speed of the rear wheels of the vehicle. Furthermore, it should be apparent that the control mechanism is not effective during reverse operation of the vehicle.

It should be further understood that applicant has made a detailed description of an embodiment of the present invention hereinabove and that certain modifications, changes, and adaptations may be made therein by those skilled in the art to which it relates and it is intended to cover all such modifications, changes, and adaptations which come within the scope of the appended claims.

Having described my invention, I claim:

1. A control mechanism for a vehicle comprising a rotatable member driven at angular velocity proportional to the angular velocity of at least one wheel of a vehicle, a rotatable flywheel, means for effecting rotation of said flywheel including a disconnectible drive connection between said flywheel and said rotatable member comprising a first part fixed against axial movement, spring means operatively interconnecting said first part and said flywheel and through which the drive to said flywheel is transmitted, and a second part driven by said rotatable member and engageable with said first part to drive said first part and movable axially relative to said first part to disconnect the drive therebetween.

2. A control mechanism as defined in claim 1 wherein said spring means includes a spring member having a hub supported at said first part and plural spring fingers projecting from said hub with the outer ends of each of said spring fingers drivingly engaged with said flywheel.

3. A control mechanism as defined in claim 1 wherein said first part includes a first clutch portion and said second part includes a second clutch portion driven by said rotatable member, said first and second clutch portions having interengaging means operable to effect axial movement of said second clutch portion relative to said first clutch portion when said first clutch portion rotates relative to said second clutch portion, and further including a third part spaced axially from said second part and being drivingly connected to said rotatable member, and spring means for transmitting drive between said second and third parts and biasing said interengaging means into driving engagement.

4. A control mechanism for a vehicle comprising a rotatable member driven at angular velocity proportional to the angular velocity of one wheel of the vehicle, a rotatable flywheel, means for effecting rotation of said flywheel including a disconnectible drive connection between said flywheel and said rotatable member comprising a part and yieldable means drivingly connecting said part to said flywheel to transmit torque therebetween and providing for limited movement of said flywheel relative to said part, means for reducing the angular velocity of said flywheel in proportion to the linear deceleration of the vehicle, said means including means supporting said flywheel for axial shifting movement in response to a decrease in the linear velocity of the vehicle, and friction pad means associated with said flywheel and operable to reduce the angular velocity of said flywheel when said flywheel shifts axially.

5. A control mechanism for a vehicle comprising a rotatable member driven at an angular velocity proportional to the angular velocity of one wheel of the vehicle, a rotatable flywheel, means for effecting rotation of said flywheel including a disconnectible drive connection between said flywheel and said rotatable member comprising a part fixed against axial movement, and yieldable means drivingly connecting said part and said flywheel to transmit torque therebetween providing for limited movement of said flywheel relative to said part, said part includes a first clutch portion and further includes a second member having a second clutch portion driven by said rotatable member, means mounting said second clutch portion for axial movement relative to said first clutch portion, said first and second clutch portions having interengaging means operable to effect axial movement of said second clutch portion relative to said first clutch portion when said first clutch portion rotates relative to said second clutch portion, and means biasing said interengaging means into driving engagement, said biasing means comprises spring means operatively connected to said rotatable member and said second member and operable to transmit torque from said rotatable member to said second member and to effect the biasing of said clutch portion into driving engagement.

6. A control mechanism for comparing the linear velocity of a vehicle with the angular speed of rotation of at least one wheel of the vehicle comprising a rotatable member driven in first and second directions when the vehicle is driven in forward and reverse directions respectively, and at an angular velocity proportional to the angular speed of rotation of the one wheel of the vehicle, a rotatable flywheel, means for driving said flywheel upon rotation of said member including a disconnectible driving connection between said flywheel and said member and including a part movable when the angular velocity of the flywheel exceeds the angular velocity of said rotatable member, signal means responsive to movement of said part to provide a control signal, means for blocking movement of said part to prevent actuation of said signal means when said member rotates in said second direction including a collar drivingly connected with said member and having a portion which blocks said movement of said part upon rotation of said member in said second direction whereby said signal means is inoperative when said vehicle is driven in reverse.

7. A control mechanism as defined in claim 6 wherein said part and said collar have axially extending abutment means engageable to prevent axial shifting of said part, and means effective to axially align said abutments.

8. A control mechanism as defined in claim 7 wherein said last named means further includes means defining a driving connection between said collar and said rotatable member effective to cause the collar abutment to lag the part abutment in the direction of rotation of said part and collar when said member is rotating in said first direction.

9. A control mechanism as defined in claim 8 further including brake means engageable with said collar and operable during rotation of said rotatable member in said second direction to prevent movement of said collar until said part rotates an amount corresponding to the extent said collar abutment lags said part abutment to thereby align said abutments and prevent axial shifting of said part, and said driving connection includes a member effective to positively rotate said part relative to said collar until said abutments axially align.

10. A control mechanism as defined in claim 6 wherein said driving connection includes a pin secured to said rotatable member, spaced recess means formed in said collar and adapted to receive portions of said pin to provide for limited relative movement between said pin and said collar, spring means operatively connected to said rotatable member, said collar and said part and operable to transmit drive from said rotatable member to said part and also effective to bias said part away from said collar.

11. A control mechanism as defined in claim 6 wherein said disconnectable driving connection includes a second collar mounted on said rotatable member to prevent axial movement thereof relative to said rotatable member, yieldable means providing a driving connection between said second collar and said flywheel for rotating said flywheel, said part and said second collar having interengaging portions effective during rotation of said rotatable member in said first direction to drive said flywheel and effective during rotation of said flywheel at a predetermined greater angular velocity than the rotary member to shift said part axially away from said second collar member.

12. A control mechanism for comparing the linear velocity of a vehicle with the angular speed of rotation of at least one wheel of the vehicle comprising a rotatable member driven at an angular velocity proportional to the angular velocity of the one wheel of the vehicle, a flywheel, means for effecting rotation of said flywheel at an angular velocity proportional to the linear velocity of the vehicle including a disconnectible drive connection between said flywheel and said rotatable member including a driving member supported on said rotatable member, a driven member drivingly connected with said driving member and operatively connected to said flywheel to impart rotation thereto, said driving and driven members having interengaging parts effective to transmit drive therebetween, spring member operatively connecting said driving member to said rotatable member to transmit drive therebetween and to bias said driving and driven members into driving engagement.

13. A control mechanism for comparing the linear velocity of a vehicle with the angular speed of rotation with at least one wheel of the vehicle comprising a rotatable member driven at an angular velocity proportional to the angular velocity of the one wheel of the vehicle, a flywheel, means for effecting rotation of said flywheel at an angular velocity proportional to the linear velocity of the vehicle including a disconnectible drive connection between said flywheel and rotatable member including a drive member supported on said rotatable member, a driven member drivingly connected to said driving member and operatively connected to said flywheel to impart rotation thereto, said driving and driven members having interengaging parts effective to transmit drive therebetween, yieldable means operatively connecting said driving member to said rotatable member to transmit drive therebetween and to bias said driving and driven members into driving engagement, means supporting said flywheel for axial movement relative to said driven member and means providing a yieldable driving connection between said driven member and said flywheel.

14. A control mechanism for comparing the linear velocity of a vehicle with the angular speed of rotation of at least one wheel of the vehicle comprising a rotatable member driven at an angular velocity proportional to the angular velocity of the one wheel of the vehicle, a flywheel, means for effecting rotation of said flywheel at an angular velocity proportional to the linear velocity of the vehicle including a disconnectible drive connection between said flywheel and said rotatable member including a drive member supported on said rotatable member, a driven member drivingly connected with said driving member and operatively connected to said flywheel to impart rotation thereto, said driving and driven members having interengaging parts effective to transmit drive therebetween, yieldable means operatively connecting said driving member to said rotatable member to transmit drive therebetween and to bias the driving and driven members into driving engagement, means for reducing the angular velocity of said flywheel in proportion to the linear deceleration of the vehicle including friction means supported adjacent said flywheel, and means mounting said flywheel for axial shifting relative to said driven member to engage said friction pad means.

15. A control mechanism for comparing the linear velocity of a vehicle to the angular speed of rotation of at least one wheel of the vehicle comprising a rotatable member driven at an angular velocity proportional to the angular velocity of the one wheel of the vehicle, a flywheel, means for effecting rotation of said flywheel at an angular velocity proportional to the linear velocity of the vehicle including a disconnectible drive connection between said flywheel and said rotatable member including a drive member support on said rotatable member, a driven member drivingly connected with said driving member and operatively connected to said flywheel to impart rotation thereto, said driving and driven members having interengaging parts effective to transmit drive therebetween, yieldable means operatively connecting said driving member to said rotatable member to transmit drive therebetween and to bias said driving and driven members into driving engagement, means supporting said driving member on said rotatable member for axial movement relative thereto, said yieldable means including a spring means operatively connected to said rotatable member and said driving member to transfer torque therebetween and to bias said driving member into driving engagement with said driven member.

16. A control mechanism for controlling the pressure applied to hydraulically actuated brakes of a vehicle comprising a rotatable member driven at an angular velocity proportional to the average angular velocity of the rear wheels of the vehicle, a vehicle deceleration sensing flywheel, a disconnectible drive connection between said flywheel and said rotatable member disconnected when said flywheel angular velocity exceeds the angular velocity of said rotatable member, said disconnectible drive connection including a collar encircling said rotatable member, means mounting said collar for axial movement along said rotatable member, yieldable means drivingly connecting said collar to said rotatable member and to said flywheel, means for reducing the angular velocity of said flywheel in proportion to the linear deceleration of the vehicle, means operable in response to axial shifting of said collar to produce a continuous control signal when said flywheel velocity exceeds the velocity of the rotatable member as when the vehicle skids, and means for relieving the hydraulic pressure in the vehicle brakes in response to receipt of said control signal.

References Cited

UNITED STATES PATENTS

| | | | |
|---|---|---|---|
| 2,379,289 | 6/1945 | Farmer | 303—21 |
| 2,573,386 | 10/1951 | Birkoben et al. | 188—181 |
| 2,631,696 | 3/1953 | Yarber | 188—181 |
| 2,772,904 | 12/1956 | Doolittle | 188—181 |
| 2,992,859 | 7/1961 | Sampietro | 303—24 |
| 3,311,423 | 3/1967 | Horvath | 303—21 |

EUGENE G. BOTZ, *Primary Examiner.*